United States Patent
Liu

(10) Patent No.: US 10,244,123 B2
(45) Date of Patent: Mar. 26, 2019

(54) MASTER-SLAVE WIRELESS DOORBELL INTERCOM SYSTEM

(71) Applicant: Guangdong Sanzhu Technology Co. Ltd., Heyuan, Guangdong Province (CN)

(72) Inventor: Jun Liu, Taiyuan (CN)

(73) Assignee: Guangdong Sanzhu Technology Co. Ltd., Heyuan (CN)

( * ) Notice: Subject to any disclaimer, the term of this patent is extended or adjusted under 35 U.S.C. 154(b) by 0 days.

(21) Appl. No.: 15/614,685

(22) Filed: Jun. 6, 2017

(65) Prior Publication Data
US 2018/0302517 A1    Oct. 18, 2018

(30) Foreign Application Priority Data
Apr. 13, 2017  (CN) .................... 2017 2 0388233 U

(51) Int. Cl.
*H04M 11/02* (2006.01)
*H04B 7/24* (2006.01)
*H04B 1/44* (2006.01)
*H04W 84/20* (2009.01)

(52) U.S. Cl.
CPC ............ *H04M 11/025* (2013.01); *H04B 1/44* (2013.01); *H04B 7/24* (2013.01); *H04W 84/20* (2013.01)

(58) Field of Classification Search
None
See application file for complete search history.

(56) References Cited

U.S. PATENT DOCUMENTS

| | | | |
|---|---|---|---|
| 2007/0224936 A1* | 9/2007 | Desai | H04W 52/242 455/41.2 |
| 2010/0112963 A1* | 5/2010 | Bing Hung | G08B 3/10 455/90.1 |
| 2017/0145713 A1* | 5/2017 | Ahearn | G07C 9/00174 |

* cited by examiner

*Primary Examiner* — Mohammed Rachedine
(74) *Attorney, Agent, or Firm* — Bay State IP, LLC

(57) ABSTRACT

The present utility model relates to a master-salve wireless doorbell intercom system, comprising an indoor unit and an outdoor unit, wherein the indoor unit comprises a first power management unit, a first microprocessor, a first communication module and a first voice module, with both the first power management unit and the first communication module being electrically connected to the first microprocessor, and the first voice module being electrically connected to the first communication module; and, the outdoor unit comprises a second power management unit, a second microprocessor, a second communication module, a third communication module and a second voice module, with the second communication module and the third communication module being communicatively connected to the first communication module, respectively. The present utility model makes use of the intercom technology.

10 Claims, 3 Drawing Sheets

MASTER-SLAVE WIRELESS DOORBELL INTERCOM SYSTEM

CROSS REFERENCE TO RELATED APPLICATION

This application claims the benefit of and takes priority from Chinese Patent Application Serial No. 201720388233.2 filed on Apr. 13, 2017, the contents of which are herein incorporated by reference.

TECHNICAL FIELD

The present utility model belongs to the technical field of short-range wireless communications, and in particular to a master-slave wireless doorbell intercom system.

BACKGROUND OF THE PRESENT INVENTION

With the continuous development of society and economy, people's standard of living is improving increasingly, accompanied with higher requirements on products. Wired doorbells cannot fully meet the consumers' increasingly diverse demands any more. It is a trend and direction to get rid of the constraints of wired doorbells and realize wireless communication doorbells with intercom function. Wireless visual doorbells currently available on the market can realize two-way communication in both video and voice, with the need of being connected over a wireless network such as 2.4 G, 1.8 G, 900 MHz or WiFi. Restricted to a series of problems such as signal strength, transmission distance, network requirements and cost, the wireless visual doorbells have been unable to quickly occupy the market. Although some of wired and wireless doorbells can realize indoor and outdoor communication, the communication with an indoor person can be realized only after an outdoor person keep presses the key. However, many visitors have no idea of this or the communication distance is short or the Installation is very complex.

With the development of the walkie talkie communication, the walkie talkie market gradually becomes an important professional communication market, and walkie talkie are one of the fastest growing communication products in addition to mobile phones. walkie talkie have been widely applied in various aspects of the national economy, and have become important wireless communication devices for family life, traffic management, petrochemical engineering, building construction, property security and other departments. Due to the rapid development of the walkie talkie technology, the cost becomes lower, and applications which could never be expected in many conventional fields have become feasible. The introduction of the intercom technology will greatly improve people's quality of life: (1) many wired products may be turned into wireless products, so the installation cost is reduced and the purpose of mobile and convenient use is realized; (2) the communication is realized by the products' own receiving and transmitting functions without any other networks; (3) with built-in batteries, the walkie talkie can still operate normally even in the event of power failure; and (4) the walkie talkie technology has a long transmission distance, which is an advantage which cannot be matched by the 2.4 G, 900 MHz, WiFi and other technologies.

SUMMARY OF THE PRESENT INVENTION

Accordingly, an objective of the present utility model is to overcome the deficiencies of the prior art and utilize the walkie talkie technology to develop a master-salve wireless doorbell intercom system with simple operation, low cost and long communication distance.

For this purpose, the present utility model employs the following technical solutions.

A master-slave wireless doorbell intercom system is provided, including an indoor unit and an outdoor unit;

the indoor unit includes a first power management unit, a first microprocessor, a first communication module and a first voice module, with both the first power management unit and the first communication unit being electrically connected to the first microprocessor, and the first voice module being electrically connected to the first communication module;

the outdoor indoor unit includes a second power management unit, a second microprocessor, a second communication module, a third communication module and a second voice module, with all the second power management unit, the second communication module and the third communication module being electrically connected to the second microprocessor, and the second voice module being electrically connected to the second communication module; and the second communication module and the third communication module are communicatively connected to the first communication module, respectively.

The first communication module includes a first RF module, a first RF amplifier circuit, a first transmit/receive switching circuit and a first antenna, with the first RF module being electrically connected to the first microprocessor, the first antenna, the first transmit/receive switching circuit, the first RF amplifier circuit and the first RF module being electrically connected successively, and the first transmit/receive switching circuit being also electrically connected to the first RF module directly.

The first voice module includes a first audio power simplifier, a first loudspeaker and a first microphone, with the first loudspeaker, the first audio power amplifier and the first RF module being electrically connected successively, and the first microphone being electrically connected to the first RF module.

The indoor unit further includes a shell, and the first power management unit, the first microprocessor, the first communication module and the first voice module are all disposed within the shell.

The indoor unit further includes a battery disposed within the shell, and the battery is electrically connected to the first power management unit; and the indoor unit further includes a talk key and an cut key, which are both disposed on the surface of the shell, and both the talk key and the cut key are electrically connected to the first microprocessor.

The second communication module includes a second RF module, a second RF amplifier circuit, a second transmit/receive switching circuit and a second antenna, with the second RF module being electrically connected to the second microprocessor, the second antenna, the second transmit/receive switching circuit, the second RF amplifier circuit and the second RF module being electrically connected successively, and the second transmit/receive switching circuit being also electrically connected to the second RF module directly.

The second voice module includes a second audio power simplifier, a second loudspeaker and a second microphone, with the second loudspeaker, the second audio power amplifier and the second RF module being electrically connected successively, and the second microphone being electrically connected to the second RF module.

The third communication module includes a third antenna, an RF filter and a third RF module, with the third antenna, the RF filter and the third RF module being electrically connected successively, and the third RF module being electrically connected to the second microprocessor.

The outdoor unit further includes a shell, and the second power management unit, the second microprocessor, the second communication module, the third communication module and the second voice module are all disposed within the shell.

The outdoor unit further includes a battery disposed within the shell, and the battery is electrically connected to the second power management unit; and The outdoor unit further includes a doorbell key disposed on the surface of the shell, and the doorbell key is electrically connected to the second microprocessor.

The present utility model employs the above technical solutions, and makes use of the walkie talkie technology. The outdoor unit includes two RF modules, one of which is used for voice communication while the other one of which is used for receiving transmit/receive switching signals transmitted by the indoor unit. Thus, the indoor unit may control the outdoor unit to receive or transmit voice communication, that is, the communication signals receiving or transmitting of the outdoor unit is controlled by the indoor unit, so that the master-slave function is realized. Hence, after the doorbell is rung by the outdoor unit, The indoor person may choose whether to initiate a conversation with the outdoor person, if indoor person press down talk key who can talk to outdoor person, when indoor person release talk key, the outdoor person can talk to indoor without press any key. It is simple for outdoor person. Also indoor person who can choose whether to stop ringing, or whether to terminate the conversation with the outdoor person.

BRIEF DESCRIPTION OF THE DRAWINGS

To describe the technical solutions in the embodiments of the present utility model or in the prior art more clearly, the accompanying drawings to be used in the descriptions of the embodiments or the prior art will be briefly described below. Apparently, the accompanying drawings described hereinafter are merely some of embodiments of the present utility model, and a person of ordinary skill in the art can obtain other drawings according to these drawings without any creative effort.

DETAILED DESCRIPTION OF THE PRESENT INVENTION

To make the objectives, technical solutions and advantages of the present utility model clearer, the technical solutions of the present utility model will be described below in detail. Apparently, the embodiments described herein are a part of but not all of the embodiments of the present utility model. All other embodiments obtained by a person of ordinary skill in the art on the basis of the embodiments in the present utility model without any creative effort shall fall into the protection scope of the present utility model.

The present utility model provides a master-salve wireless doorbell intercom system, including an indoor unit and an outdoor unit.

Figure 1:
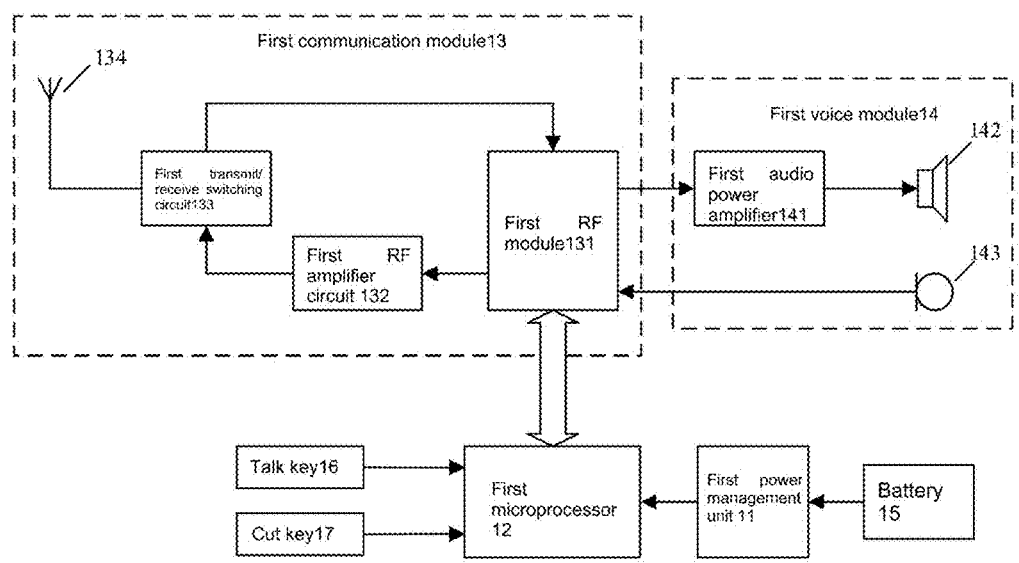
FIG. 1 is a circuit structure diagram of an indoor unit of a master-salve wireless intercom system doorbell according to the present utility model.

As shown in FIG. 1, the indoor unit includes a first power management unit 11, a first microprocessor 12, a first communication module 13 and a first voice module 14. Both the first power management unit 11 and the first communication unit 13 are electrically connected to the first microprocessor 12. The first voice module 14 is electrically connected to the first communication module 13. The power management unit is used for supplying power to the microprocessor, and controlled by the microprocessor. The power management unit also supplies power to other circuits and units.

Figure 2:
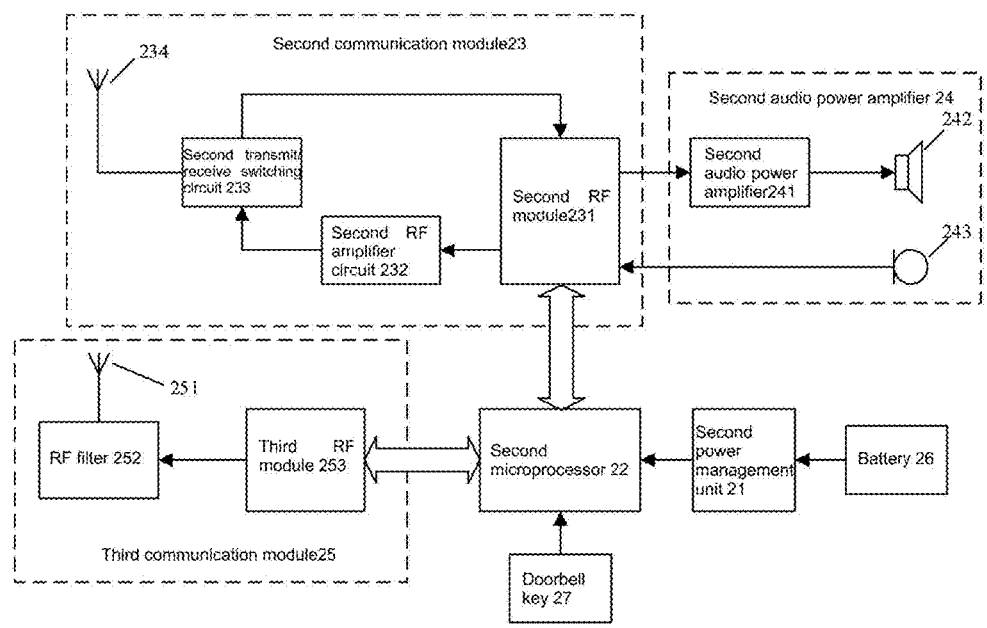
FIG. 2 is a circuit structure diagram of an outdoor unit of the master-salve wireless intercom system doorbell according to the present utility model.

As shown in FIG. 2, the outdoor indoor unit includes a second power management unit 21, a second microprocessor 22, a second communication module 23, a third communication module 25 and a second voice module 24. All the second power management unit 21, the second communication module 23 and the third communication module 25 are electrically connected to the second microprocessor 22. The second voice module 24 is electrically connected to the second communication module 23.

The second communication module 23 and the third communication module 25 are communicatively connected to the first communication module 13, respectively.

To further describe the present parent in detail, the present utility model will be extensively described below.

As shown in FIG. 1, the first communication module includes a first RF module, a first RF amplifier circuit, a first transmit/receive switching circuit and a first antenna. The first RF module is electrically connected to the first microprocessor for receiving and transmitting a voice from and to the RF module. The first antenna, the first transmit/receive switching circuit, the first RF amplifier circuit and the first RF module are electrically connected successively. The first transmit/receive switching module is also electrically connected to the first RF module directly.

RF signals output by the RF module are passed through the RF amplifier circuit, then passed to the transmit/receive switching circuit, and finally transmitted by the antenna. The RF signals received by the antenna are passed to the RF module through the transmit/receive switching circuit for audio demodulation.

The first voice module includes a first audio power amplifier, a first loudspeaker and a first microphone. The first loudspeaker, the first audio power simplifier and the first RF module are electrically connected successively for amplifying and sending the sound. The first microphone is electrically connected to the first RF module for inputting sound signals.

As shown in FIG. 2, the second communication module includes a second RF module, a second RF amplifier circuit, a second transmit/receive switching circuit and a second antenna. The second RF module is electrically connected to the second microprocessor for receiving and transmitting a voice from and to the RF module. The second antenna, the second transmit/receive switching circuit, the second RF amplifier circuit and the second RF module are electrically connected successively. The second transmit/receive switching module is also electrically connected to the second RF module directly.

RF signals output by the RF module are passed through the RF amplifier circuit, are then passed to the transmit/receive switching circuit, and finally transmitted by the antenna. The RF signals received by the antenna are passed to the RF module through the transmit/receive switching circuit for audio demodulation.

The second voice module includes a second audio power amplifier, a second loudspeaker and a second microphone. The second loudspeaker, the second audio power simplifier and the second RF module are electrically connected successively for amplifying and sending the sound. The second microphone is electrically connected to the second RF module for inputting sound signals.

The third communication module includes a third antenna, an RF filter and a third RF module. The third antenna, the RF filter and the third RF module are electrically connected successively, and the third RF module is electrically connected to the second microprocessor.

The third antenna is connected to the third RF module via a filter, for receiving a switch-to-receive instruction or switch-to-transmit instruction from the indoor unit, in order to realize the purpose that the indoor unit controls the outdoor unit to receive or transmit signals. That is, the receiving or transmitting of the outdoor unit is controlled by the indoor unit, so that the master-slave function is realized.

Figure 3:
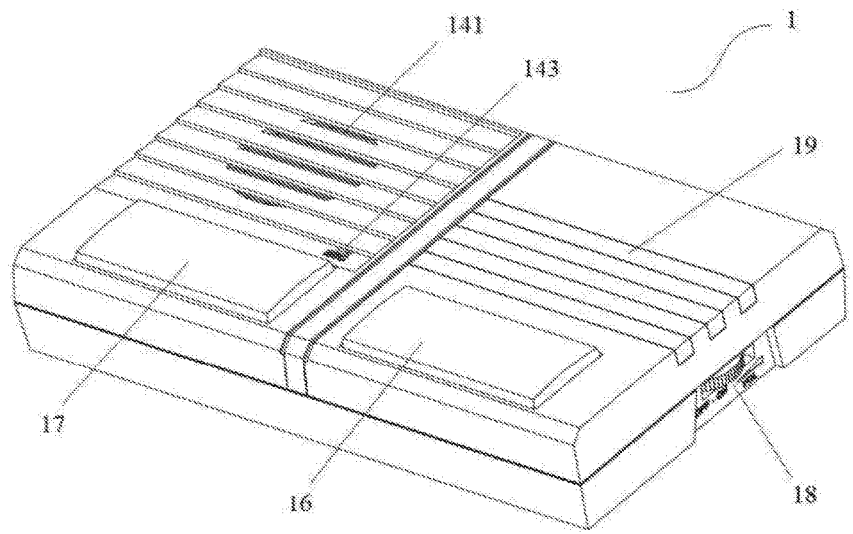
FIG. 3 is a structure diagram of the indoor unit of the master-salve wireless intercom system doorbell according to the present utility model.

As shown in FIG. 3, the indoor unit further includes a shell, and the first power management unit, the first microprocessor, the first communication module and the first voice module are all disposed within the shell. A volume adjustment knob 18 and a display lens 19 are further provided on the surface of the shell. Both the volume adjustment knob 18 and the display lens 19 are electrically connected to the first microprocessor 12.

The indoor unit further includes a battery disposed within the shell, and the battery is electrically connected to the first power management unit.

The indoor unit further includes a talk key and a cut key, which are both disposed on the surface of the shell, and both the talk key and the cut key are electrically connected to the first microprocessor. The talk key and the cut key are configured to send an instruction to the microprocessor. An indoor person may decide whether to talk with an outdoor person, whether to stop ringing, whether to terminate the conversation with the outdoor person, or whether to talk with the outdoor person for a long period of time.

Figure 4:
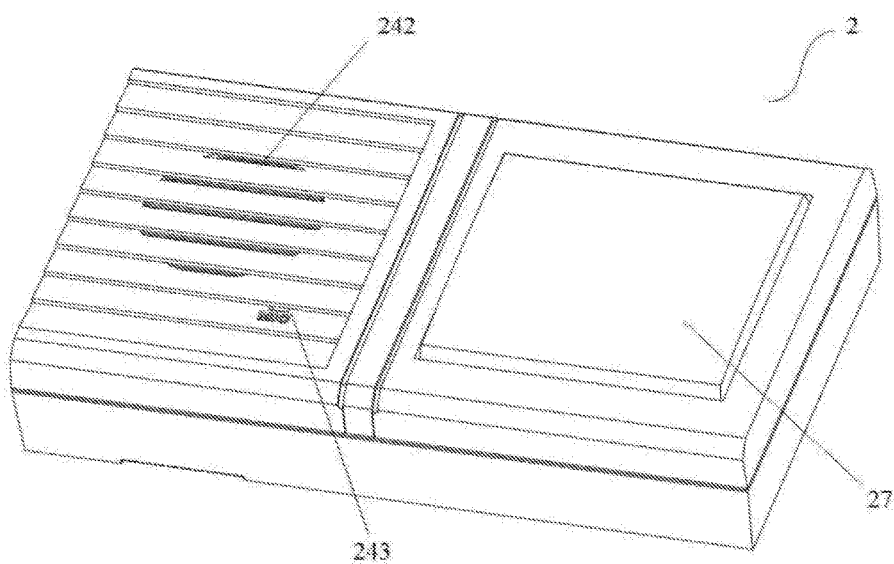
FIG. 4 is a structure diagram of the outdoor unit of the master-salve wireless doorbell intercom system according to the present utility model, in which:
1: indoor unit;
11: first power management unit;
12; first microprocessor;
13: first communication module;
14: first voice module;
15: battery;
16: talk key;
17: cut key;
18: volume adjustment knob;
19: display lens;
2: outdoor unit;
21: second power management unit;
22: second microprocessor;
23: second communication module;
24: second voice module;
25: third communication module;
26: battery; and
27: doorbell key.

As shown in FIG. 4, the outdoor unit 2 further includes a shell, and the second power management unit, the second microprocessor, the second communication module, the third communication module and the second voice module are all disposed within the shell.

The outdoor unit 2 further includes a battery disposed within the shell, and the battery is electrically connected to the second power management unit.

The outdoor unit 2 further includes a doorbell key 27 disposed on the surface of the shell, and the doorbell key is electrically connected to the second microprocessor for sending an instruction to the microprocessor.

The foregoing descriptions merely show specific implementations of the present utility model, and the protection scope of the present utility model is not limited thereto. A person of ordinary skill in the art may easily conceive of variations or replacements within the technical scope disclosed in the present utility model, and these variations or replacements shall fall into the protection scope of the present utility model. Accordingly, the protection scope of the present utility model shall be subject to the protection scope of the claims.

What is claimed is:

1. A master-slave wireless doorbell intercom system, comprising:
    an indoor unit, wherein the indoor unit further comprises:
        a first power management unit;
        a first microprocessor;
        a first communication module, wherein the first communication module further comprises a first RF module, a first RF amplifier circuit, a first transmit/receive switching circuit and a first antenna; and
        a first voice module, wherein the first communication module and the first communication unit are electrically connected to the first microprocessor; and the first voice module is electrically connected to the first communication module;
        wherein the first RF module outputs a plurality of signals that are initially passed through the RF amplifier circuit, the transmit/receive switching circuit, and then transmitted by the first antenna which receives the signals and then passes the signals to the RF module through the first transmit/receive switching circuit for audio demodulation;
        wherein the first RF module is electrically connected to the first microprocessor, the first antenna, the first transmit/receive switching circuit, and the first RF amplifier circuit;
        wherein the indoor unit further comprises a means of controlling whether the outdoor unit receives or transmits voice communication, wherein the inside user presses down a talk key to talk and releases the talk key to allow the outside user to talk without pressing any keys, and the indoor user chooses whether to stop ringing or whether to terminate a conversation with the outdoor user
    an outdoor unit, wherein the outdoor unit further comprises:
        a second power management unit;
        a second microprocessor;
        a second communication module;
        a third communication module, the third communication module further comprises a third antenna, an RF filter and a third RF module, wherein the third antenna, the RF filter, and the third RF module are electrically connected in succession, and the third RF module is electrically connected to the second microprocessor; and a second voice module;

wherein the second power management unit, the second communication module, and the third communication module are electrically connected to the second microprocessor, and the second voice module is electrically connected to the second communication module;

wherein the second communication module and the third communication module are communicatively connected to the first communication module;

wherein the third antenna is connected to the RF module by means of the RF filter, wherein the third antenna receives switch-to-receive and switch-to-transmit instruction from the indoor unit to establish a master-slave function; and wherein the second communication module and the third communication module further comprise RF modules, wherein the second communication module is used for voice communication and the third communication module is used for receiving and transmitting switching signals transmitted by the indoor unit.

2. The master-slave wireless doorbell intercom system according to claim 1, wherein the first voice module comprises a first audio power simplifier, a first loudspeaker, and a first microphone, wherein the first loudspeaker, the first audio power amplifier, and the first RF module are electrically connected successively, and the first microphone is electrically connected to the first RF module.

3. The master-slave wireless doorbell intercom system according to claim 2, wherein the indoor unit further comprises a shell, and the first power management unit, the first microprocessor, the first communication module, and the first voice module are disposed within the shell.

4. The master-slave wireless doorbell intercom system according to claim 3, wherein the indoor unit further comprises a battery disposed within the shell, and the battery is electrically connected to the first power management unit; and the indoor unit further comprises the talk key and a cut key, wherein the talk key and the cut key are disposed on the surface of the shell and electrically connected to the first microprocessor.

5. The master-slave wireless doorbell intercom system according to claim 1, wherein the second communication module comprises a second RF module, a second RF amplifier circuit, a second transmit/receive switching circuit, and a second antenna;

wherein the second RF module is electrically connected to the second microprocessor, the second antenna, the second transmit/receive switching circuit, and the second RF amplifier circuit; and wherein the second RF module is electrically connected successively to the second transmit/receive switching circuit.

6. The master-slave wireless doorbell intercom system according to claim 5, wherein the second voice module comprises a second audio power simplifier, a second loudspeaker and a second microphone;

wherein the second loudspeaker, the second audio power amplifier, and the second RF module are electrically connected successively, and the second microphone is electrically connected to the second RF module.

7. The master-slave wireless doorbell intercom system according to claim 5, wherein the outdoor unit further comprises a shell; and wherein the second power management unit, the second microprocessor, the second communication module, the third communication module, and the second voice module are disposed within the shell.

8. The master-slave wireless doorbell intercom system according to claim 6, wherein the outdoor unit further comprises a shell; and wherein the second power management unit, the second microprocessor, the second communication module, the third communication module and the second voice module are all disposed within the shell.

9. The master-slave wireless doorbell intercom system according to claim 1, wherein the outdoor unit further comprises a shell; and wherein the second power management unit, the second microprocessor, the second communication module, the third communication module, and the second voice module are disposed within the shell.

10. The master-slave wireless doorbell intercom system according to claim 1, wherein the outdoor unit further comprises a battery disposed within the shell, and the battery is electrically connected to the second power management unit; and wherein the outdoor unit further comprises a doorbell key disposed on the surface of the shell, and the doorbell key is electrically connected to the second microprocessor.

* * * * *